United States Patent
Jywe et al.

(10) Patent No.: US 9,244,458 B2
(45) Date of Patent: Jan. 26, 2016

(54) METHOD OF NUMERICAL-CONTROL SCRAPING OF A WORK PIECE

(75) Inventors: Wen-Yuh Jywe, Yunlin Hsien (TW);
Tung-Hsien Hsieh, Yunlin Hsien (TW);
Chia-Hung Chen, Yunlin Hsien (TW);
Chin-Hui Huang, Yunlin Hsien (TW);
Ying-Chien Tsai, Kaohsiung (TW);
Yen-Chieh Wang, Yunlin Hsien (TW)

(73) Assignee: NATIONAL FORMOSA UNIVERSITY, Yunlin Hsien (TW)

( * ) Notice: Subject to any disclaimer, the term of this patent is extended or adjusted under 35 U.S.C. 154(b) by 1037 days.

(21) Appl. No.: 13/354,548

(22) Filed: Jan. 20, 2012

(65) Prior Publication Data
US 2013/0190912 A1  Jul. 25, 2013

(51) Int. Cl.
*G05B 19/4097* (2006.01)

(52) U.S. Cl.
CPC .. *G05B 19/4097* (2013.01); *G05B 2219/49084* (2013.01)

(58) Field of Classification Search
CPC ............. G05B 19/49084; G05B 19/4097
USPC ........................................................ 700/98
See application file for complete search history.

(56) References Cited

U.S. PATENT DOCUMENTS

| | | | |
|---|---|---|---|
| 2,930,228 A | 3/1960 | Lawrence et al. | |
| 4,633,057 A | 12/1986 | Wilson et al. | |
| 7,423,744 B2 | 9/2008 | Uesugi et al. | |
| 2007/0070099 A1 | 3/2007 | Beer et al. | |
| 2010/0093568 A1* | 4/2010 | Tagawa et al. | 508/133 |
| 2011/0275280 A1* | 11/2011 | Jywe et al. | 451/5 |

* cited by examiner

*Primary Examiner* — Robert Fennema
*Assistant Examiner* — Fenyang Stewart
(74) *Attorney, Agent, or Firm* — Bacon & Thomas, PLLC

(57) ABSTRACT

A method of numerical-control scraping of a work piece has a preparing step, a scanning step, a flatness-parameter inputting step, a surface-finishing step, a related-parameter inputting step, an auto-scraping step and an analyzing step. The preparing step comprises preparing a multi-axis machine tool, a laser displacement meter, an auto scraping apparatus and a computer. The scanning step comprises scanning the work piece. The flatness-parameter inputting step comprises inputting a flatness-parameter. The surface-finishing step comprises calculating out the to-be-scraped ranges of the work piece and scraping the work piece. The related-parameter inputting step comprises inputting desired PPI and POP in the computer, calculating out the HOP, the DOS and the oil content to obtain the length, the width and the depth of a single scraping process. The auto-scraping step comprises scraping the work piece to meet the requirement. The analyzing step comprises detecting the 3D-appearance drawing of the work piece.

7 Claims, 6 Drawing Sheets

METHOD OF NUMERICAL-CONTROL SCRAPING OF A WORK PIECE

BACKGROUND OF THE INVENTION

1. Field of the Invention

The present invention relates to a method of numerical-control scraping of a work piece, and more particularly to a method that can scrape a three-dimensional surface of the work piece accurately.

2. Description of Related Art

In general, a conventional hard rail for a machine tool needs to be scraped before assembling, and a scraping process is used to scrape relative high points of a contacting surface of the conventional hard rail. The scraping process can form multiple recesses on the contacting surfaces of the conventional hard rail. The recesses can be used to store lubricant to lubricate movement of a moving element on the conventional hard rail and this can reduce the friction force between the moving element and the conventional hard rail. Therefore, detecting a surface roughness of the scraped surface is very important to maintain functions of the conventional hard rail, since the surface roughness may affect mobility of the moving element on the conventional hard rail.

A conventional method for determining the surface roughness of the scraped surface comprises the following steps: painting ink on the surface of a standard holder, sliding a work piece on the surface of the standard holder so ink will be removed and be found on high points of a scraped surface of the work piece, scraping the high points of the work piece and measuring differences of height of the high points of the work piece with a measuring tool. The above-mentioned steps are repeated until the differences of height of the high points of the work piece reach the requirement. When the differences of height of the high points of the work piece reach the requirement, multiple recesses are averagely formed on the scraped surface of the work piece, sliding the work piece on the surface of the standard holder so ink will be removed and be found on the scraped surface of the work piece and a charge-couple device (CCD) can be used to screen the inked-and-scraped surface of the work piece to analyze the surface roughness of the work piece to detect the uniformity of the high points distribution of the scraped surface of the work piece.

Though the conventional detecting and scraping method can be used on a work piece of the hard rail, the detecting result of the described conventional method is not precise since the results of the conventional method are easily affected by human error and cannot analyze the work piece accurately.

To overcome the shortcomings, the present invention provides a method of numerical-control scraping of a work piece to mitigate or obviate the aforementioned problems.

SUMMARY OF THE INVENTION

The main objective of the present invention is to provide a method of numerical-control scraping of a work piece, and more particularly to a method that can scrape a three-dimensional surface of the work piece accurately.

The method of numerical-control scraping of a work piece in accordance with the present invention comprises a preparing step, a scanning step, a flatness-parameter inputting step, a surface-finishing step, a related-parameter inputting step, an auto-scraping step and an analyzing step. The preparing step comprises preparing a multi-axis machine tool, a laser displacement meter, an auto scraping apparatus and a computer. The scanning step comprises moving a loading platform of the multi-axis machine tool relative to a spindle to enable the laser displacement meter to scan the variation of a top surface of the work piece. The flatness-parameter inputting step comprises inputting a flatness-parameter according to a desired flatness of the work piece. The surface-finishing step comprises calculating out the positions, the lengths, the widths and the depths of the to-be-scraped ranges of the work piece and scraping the work piece to reach the desired flatness. The related-parameter inputting step comprises inputting a desired PPI and a desired POP in the computer to calculate out the length and the width of a single scraping process, calculating out the HOP, the DOS and the oil content by an adjusted data of the auto scraping apparatus to calculate out the depth of a single scraping process. The auto-scraping step comprises scraping the work piece to meet the requirement of oil-even-distribution. The analyzing step comprises scanning the work piece, forming a 3D-appearance drawing in the computer and detecting the 3D-appearance drawing of the work piece.

Other objectives, advantages and novel features of the invention will become more apparent from the following detailed description when taken in conjunction with the accompanying drawings.

DETAILED DESCRIPTION OF PREFERRED EMBODIMENT

Figure 1:
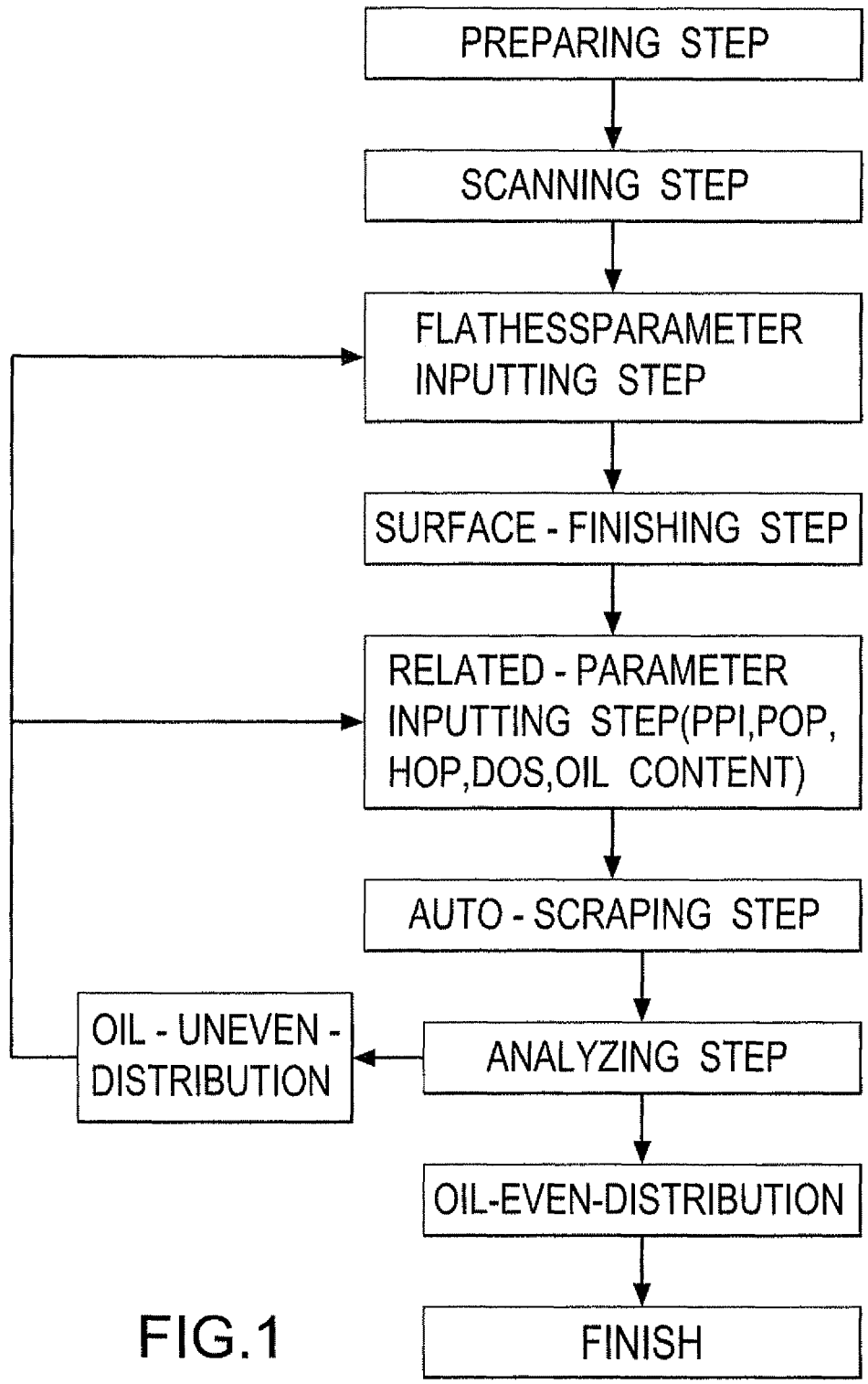
FIG. 1 is a block diagram of a method of numerical-control scraping of a work piece in accordance with the present invention.
Figure 2:
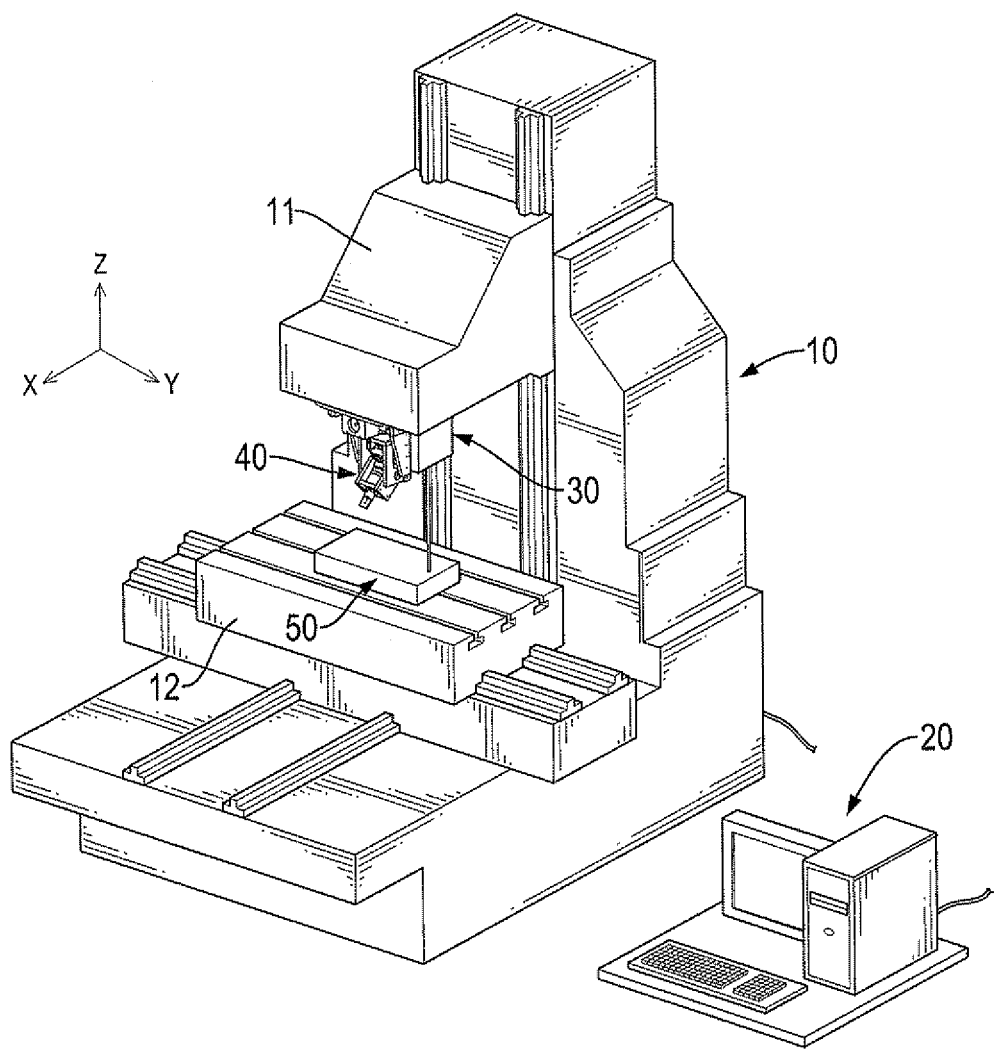
FIG. 2 is a perspective view of an auto scraping apparatus in accordance with the present invention.
Figure 3:
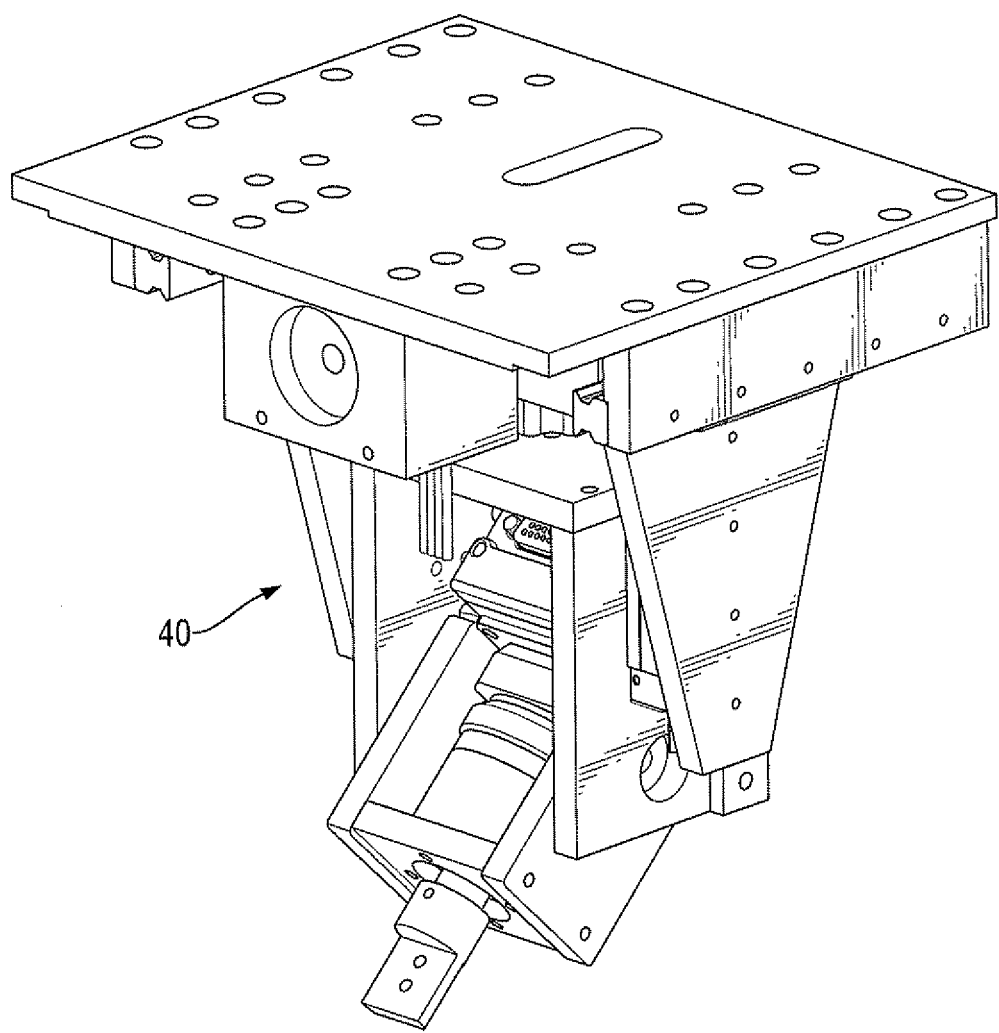
FIG. 3 is an enlarged perspective view of an auto-scraping device in FIG. 2.

With reference to FIGS. 1 to 3, a method of auto scraping a work piece 50 for a hard rail in accordance with the present invention comprises a preparing step, a scanning step, a flatness-parameter inputting step, a surface-finishing step, a related-parameter inputting step, an auto-scraping step and an analyzing step.

The preparing step comprises preparing a multi-axis machine tool 10, a work piece 50, a laser displacement meter 30, an auto scraping apparatus 40 and a computer 20.

The multi-axis machine tool 10 has a top, a bottom, a spindle 11 and a loading platform 12. The spindle 11 is movably mounted on the top of the multi-axis machine tool 10 along the Z-axis of the multi-axis machine tool 10 and has a bottom. The loading platform 12 is movably mounted on the bottom of the multi-axis machine tool 10 along the X-Y axes of the multi-axis machine tool 10 and is mounted below the spindle 11.

Figure 5:
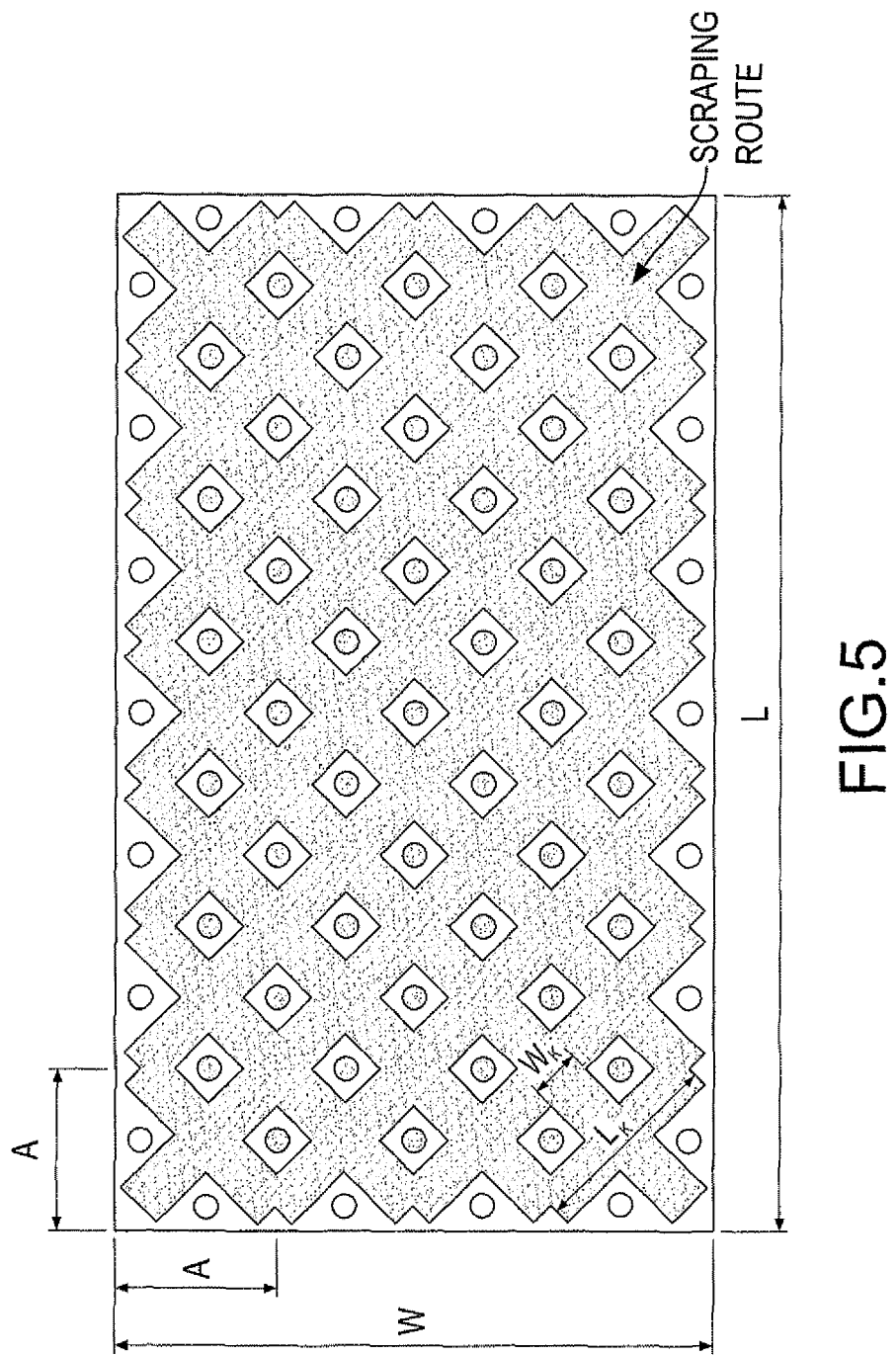
FIG. 5 is an enlarged top view of the work piece in FIG. 4.

With reference to FIGS. 2 and 5, the work piece 50 is mounted securely on the loading platform 12 of the multi-axis machine tool 10 below the spindle 11 and has a top surface. The top surface of the work piece 50 has a length (L) and a width (W), and the area of the top surface of the work piece 50 is L and W multiplied.

The laser displacement meter 30 is securely mounted on the bottom of the spindle 11 above the loading platform 12. After mounting the laser displacement meter 30 on the spindle 11, a height of the spindle 11 is adjusted relative to the loading platform 12 by the multi-axis machine tool 10 to let the valid measurement range of the laser displacement meter 30 cover the whole top surface of the work piece 50.

The auto scarping apparatus 40 is mounted securely on the bottom of the spindle 11 beside the laser displacement meter 30 to scrape the top surface of the work piece 50. The computer 20 is electrically connected to the multi-axis machine tool 10 to control the movements of the spindle 11 and the loading platform 12, is electrically connected to the laser displacement meter 30 to receive the measurement results of the top surface of the work piece 50 and is electrically connected to the auto scarping apparatus 40 to enable the auto scarping apparatus 40 to scrape the top surface of the work piece 50.

Figure 4:
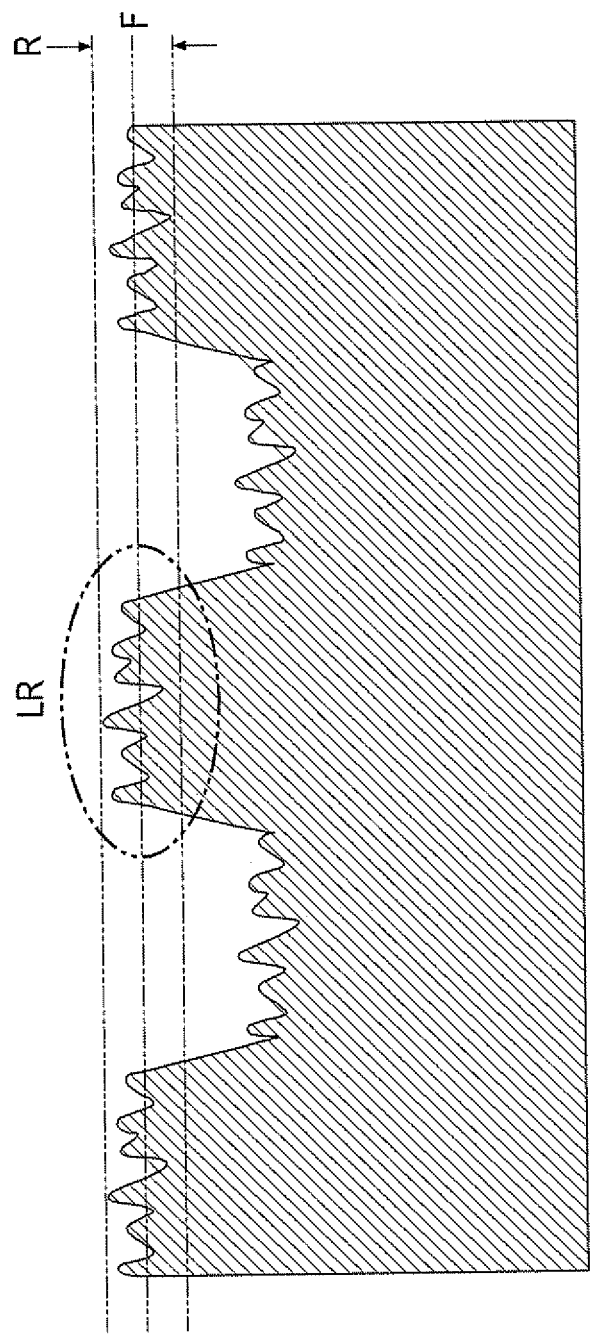
FIG. 4 is an enlarged cross-sectional side view of a work piece in accordance with the present invention.

The scanning step comprises moving the loading platform 12 along the X-Y axes of the multi-axis machine tool 10 relative to the spindle 11 to enable the laser displacement meter 30 to scan the variation of the top surface of the work piece 50. Preferably, the loading platform 12 is moved relative to the spindle 11 at a constant speed along an S-shaped route to enable the laser displacement meter 30 to scan the top surface of the work piece 50. After scanning the top surface of the working piece 50, the roughness values (R) of the top surface of the work piece 50 are read by the laser displacement meter 30 and are transferred to the computer 20 to form a three-dimensional appearance drawing of the top surface of the work piece 50 in the computer 20 as shown in FIG. 4. With reference to FIG. 4, in the three-dimensional (3D) appearance drawing of the top surface of the work piece 50, multiple loading regions (LR) are formed on and protrude from the top surface of the work piece 50 to form multiple high point regions and low point regions.

With reference to FIG. 4, the flatness-parameter inputting step comprises inputting a flatness-parameter according to a desired flatness (F) of the top surface of the work piece 50.

The surface-finishing step comprises calculating out the positions, the lengths, the widths and the depths of the to-be-scraped ranges of the top surface of the work piece 50 according to the flatness-parameter and the three-dimensional appearance drawing of the top surface of the work piece 50 by the computer 20. When the positions of the to-be-scraped ranges of the top surface of the work piece 50 have been calculated out by the computer 20, a scraping route is planned by the computer 20 according to the positions of the to-be-scraped ranges of the top surface of the work piece 50 and is transformed into a route signal. The route signal is transmitted to the multi-axis machine tool 10 to control the movements of the spindle 11 and the loading platform 12 to position the auto scraping apparatus 40 and the work piece 50. When the scraping signals of lengths, widths and depths are transformed from the lengths, the widths and the depths of the to-be-scraped ranges of the top surface of the work piece 50, the scraping signals of lengths, widths and depths are transmitted to the auto scraping apparatus 40 to scrape the top surface of the work piece 50 to reach the desired flatness (F) that is set in the flatness-parameter inputting step.

With reference to FIG. 5, in the related-parameter inputting step, a desired points per square inch (PPI) and a desired contacting ratio per square inch (POP) are inputted in the computer 20, the scraping intervals (A) between the to-be-scraped ranges of the top surface of the work piece 50 are set to the same. Then, the work piece 50 has amount of n in the length (L) and amount of m in the width (W) as shown in the equation (1):

$$n = L/A \quad m = W/A \quad (1)$$

The total number of points of the work piece 50 is shown as in the equation (2):

$$m(n-1) + n(m-1) + 2(n+m) \quad (2)$$

The desired points per square inch (PPI) is shown as in the equation (3):

$$PPI = m(n-1) + n(m-1) + 2(n+m)/L \cdot W \quad (3)$$

The desired contacting ratio per square inch (POP) is shown as in the equation (4):

$$POP = (1 - (2 \times L_k \times W_k - W_k^2)/A^2) \times 100\% \quad (4)$$

In the equation (4), $L_k$ is the length of a single scraping process and the unit of length of $L_k$ may be millimeter, the $W_k$ is the width of a single scraping process and the unit of length of $W_k$ may be millimeter.

In addition, $L_k$ can be calculated as shown in equation (5):

$$L_k = (L+W) + \sqrt{(L+W)^2 + 8(PPI \times L^2 \times W^2)}/\sin\theta \times 2(PPI \times L \times W) \quad (5)$$

After calculating out the length ($L_k$) of a single scraping process by inserting the equation (3) into the equation (5), the length ($L_k$) of a single scraping process is substituted into the equation (4) to calculate out the width ($W_k$) of a single scraping process.

Figure 6:
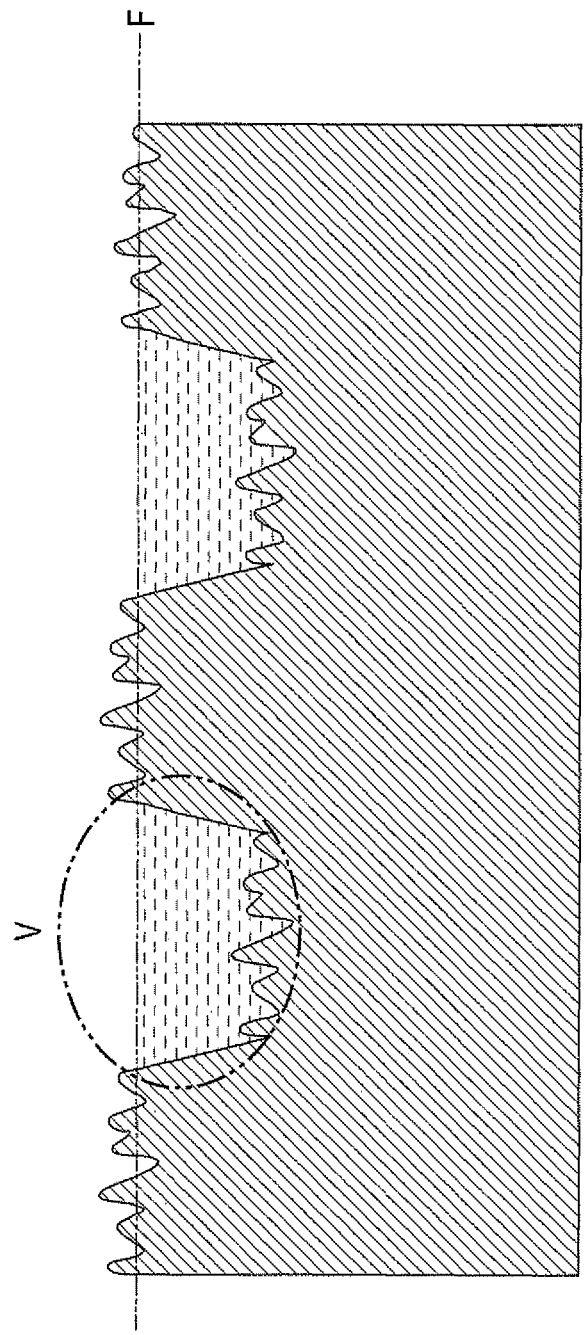
FIG. 6 is an enlarged cross-sectional side view of the work piece in FIG. 4 after scraping.

In addition, the Height of Point (HOP), the Depth of Surrounding (DOS) and the oil content (V) of the top surface of the work piece 50 can be calculated out according to a calculating program. With reference to FIG. 4, the Height of Point (HOP) is an average height value of the high point regions and the Depth of Surrounding (DOS) is an average depth of the low point regions. With reference to FIG. 6, the oil content is the volumes of stored oil in the top surface of the work piece 50 under the desired flatness (F) of the top surface of the work piece 50.

The Height of Point (HOP), the Depth of Surrounding (DOS) and the oil content (V) of the work piece 50 can be respectively shown as in equations (6), (7) and (8):

$$HOP = (H_1 + H_2 + \ldots + H_i)/n \quad (6)$$

In the equation (6), $H_i$ is the average height value of each high point region and $i = 1, 2 \ldots n$.

$$DOS = (D_1 + D_2 + \ldots + D_i)/n \quad (7)$$

In the equation (7), $D_i$ is the average depth value of each low point region and $i = 1, 2 \ldots n$.

$$OIL = \sum_i^n V_i \quad (8)$$

In the equation (8), OIL is the oil content (V) and $V_i$ is the volume of the low point region on the top surface of the work piece 50.

When the length ($L_k$) and the width ($W_k$) of a single scraping process and the oil content (V) are calculated out by the above-mentioned equations, the depth ($Z_k$) of a single scraping process can be calculated out and the unit of length of $Z_k$ may be millimeter.

Furthermore, the length ($L_k$), the width ($W_k$) and the depth ($Z_k$) of a single scraping process can be controlled by the X- and Z-axis motors of the auto scraping apparatus 40, thereinto the feed of the Z-axis motor of the auto scraping apparatus 40 will influence the magnitudes of the width ($W_k$) and the depth ($Z_k$) of a single scraping process, and the feed of the X-axis motor of the auto scraping apparatus 40 will influence the magnitude of the length ($L_k$) of a single scraping process. Additionally, a related-constant (K) exists between the depth ($Z_k$) and the width ($W_k$) of a single scraping process is shown as in equation (9):

$$Z_k = W_k \times K \qquad (9)$$

The auto-scraping step comprises calculating out the positions and a scraping route of the to-be-scraped ranges of the top surface of the work piece 50 by the computer 20 to meet the requirement of oil-even-distribution according to the desired points per square inch (PPI) and the desired contacting ratio per square inch (POP), and transforming the positions and a scraping route of the to-be-scraped ranges of the top surface of the work piece 50 into position signals and a route signal. Then, the position signals and the route signal are respectively transmitted to the multi-axis machine tool 10 and the auto scraping apparatus 40 to enable the auto scraping apparatus 40 to scrape the top surface of the work piece 50 to meet the requirement of oil-even-distribution.

The analyzing step comprises scanning the top surface of the work piece 50 after the auto-scraping step, forming a 3D-appearance drawing by the scanning data in the computer 20 and detecting the 3D-appearance drawing of the work piece 50 that has been scraped with the preceding step. If the 3D-appearance drawing of the work piece 50 meets the requirement of oil-even-distribution, the numerical-control scraping procedure of the present invention is finished. If the 3D-appearance drawing of the work piece 50 fails to meet the requirement of oil-even-distribution, the operating process is returned repeatedly to the flatness-parameter inputting step or the related-parameter inputting step to adjust the parameters until the 3D-appearance drawing of the work piece 50 meets the requirement of oil-even-distribution.

The method of numerical-control scraping of a work piece in accordance with the present invention only needs to put a work piece 50 on the loading platform 12 and the laser displacement meter 30 can scan the top surface of the work piece 50 and a 3D-appearance drawing of the work piece 50 is formed in the computer 20 by the scanning data, and the auto scraping apparatus 40 can automatically scrape the work piece 50 according to the desired flatness of the top surface of the work piece 50. After scraping the top surface of the work piece 50 in the surface-finishing step, the auto scraping apparatus 40 is driven by the computer 20 to scrape the top surface of the work piece 50 according to the desired PPI and the POP and the HOP, the DOS and the oil content to enable the auto scraping apparatus 40 to scrape the top surface of the work piece 50 to meet the requirement of oil-even-distribution. If the 3D-appearance drawing of the work piece 50 fails to meet the requirement of oil-even-distribution, the operating process is returned repeatedly to the flatness-parameter inputting step or the related-parameter inputting step to adjust the parameters until the 3D-appearance drawing of the work piece 50 meets the requirement of oil-even-distribution. Therefore, the method of numerical-control scraping of a work piece in accordance with the present invention can scrape the top surface of the work piece 50 accurately by the numerical computation of the computer 20 and the operations of the multi-axis machine tool 10, the laser displacement meter 30 and the auto scraping apparatus 40.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method of numerical-control scraping of a work piece comprising:
    a preparing step comprising:
        preparing a multi-axis machine tool, a work piece, a laser displacement meter, an auto scraping apparatus and a computer;
        mounting a spindle movably on a top of the multi-axis machine tool along the Z-axis of the multi-axis machine tool;
        mounting a loading platform movably on a bottom of the multi-axis machine tool along the X-Y axes of the multi-axis machine tool below the spindle;
        mounting the work piece securely on the loading platform below the spindle;
        mounting the laser displacement meter securely on a bottom of the spindle above the loading platform;
        mounting the auto scraping apparatus securely on the bottom of the spindle beside the laser displacement meter to scrape a top surface of the work piece; and
        connecting the computer electrically to the multi-axis machine tool to control movements of the spindle and the loading platform, to the laser displacement meter to receive measurement results of the top surface of the work piece and to the auto scarping apparatus to enable the auto scarping apparatus to scrape the top surface of the work piece;
    a scanning step comprising:
        moving the loading platform along the X-Y axes of the multi-axis machine tool relative to the spindle to enable the laser displacement meter to scan variation of the top surface of the work piece;
        reading roughness values of the top surface of the work piece by the laser displacement meter; and
        transferring the roughness values of the top surface of the work piece to the computer to form a three-dimensional appearance drawing of the top surface of the work piece in the computer;
    a flatness-parameter inputting step comprising inputting a flatness-parameter according to a desired flatness of the top surface of the work piece;
    a surface-finishing step comprising:
        calculating out positions, lengths, widths and depths of to-be-scraped ranges of the top surface of the work piece according to the flatness-parameter and the three-dimensional appearance drawing of the top surface of the work piece by the computer;
        planning a scraping route by the computer according to the positions of the to-be-scraped ranges of the top surface of the work piece and transforming the scraping route into a route signal;
        transmitting the route signal to the multi-axis machine tool to control the movements of the spindle and the loading platform to position the auto scraping apparatus and the work piece;
        transforming scraping signals of lengths, widths and depths of the top surface of the work piece from the lengths, the widths and the depths of the to-be-scraped ranges of the top surface of the work piece; and
        transmitting the scraping signals of the lengths, widths and depths of the top surface of the work piece to the auto scraping apparatus to scrape the top surface of the work piece to reach the desired flatness that is set in the flatness-parameter inputting step;

a related-parameter inputting step comprising:
  inputting a desired-points per square inch and a desired contacting ratio per square inch in the computer;
  calculating out a Height of Point, a Depth of Surrounding and an oil content of the top surface of the work piece according to an adjusted data of the auto scraping apparatus;
  calculating out a length and a width of a single scraping process of the auto scraping apparatus; and
  calculating out a depth of a single scraping process of the auto scraping apparatus according to the oil content of the top surface of the work piece and the length and the width of a single scraping process of the auto scraping apparatus;

an auto-scraping step comprising:
  calculating out the positions and the scraping route of the to-be-scraped ranges of the top surface of the work piece by the computer to meet the requirement of oil-even-distribution according to the desired points per square inch and the desired contacting ratio per square inch;
  transforming the positions and the scraping route of the to-be-scraped ranges of the top surface of the work piece into position signals and a route signal; and
  transmitting the position signals and the route signal respectively to the multi-axis machine tool and the auto scraping apparatus to enable the auto scraping apparatus to scrape the top surface of the work piece to meet the requirement of oil-even-distribution; and an analyzing step comprising:
  scanning the top surface of the work piece after the auto-scraping step;
  forming a 3D-appearance drawing by the scanning data in the computer; and
  detecting the 3D-appearance drawing of the work piece that has been scraped with the preceding step, if the 3D-appearance drawing of the work piece meets the requirement of oil-even-distribution, the numerical-control scraping procedure being finished and if the 3D-appearance drawing of the work piece fails to meet the requirement of oil-even-distribution, the operating process being returned repeatedly to the flatness-parameter inputting step or the related-parameter inputting step to adjust the parameters until the 3D-appearance drawing of the work piece meets the requirement of oil-even-distribution.

2. The method as claimed in claim 1, wherein in the preparing step, a height of the spindle is adjusted relative to the loading platform by the multi-axis machine tool to let a valid measurement range of the laser displacement meter cover the whole top surface of the work piece.

3. The method as claimed in claim 2, wherein in the scanning step, the loading platform is moved relative to the spindle at a constant speed along an S-shaped route to enable the laser displacement meter to scan the top surface of the work piece.

4. The method as claimed in claim 3, wherein in the related-parameter inputting step, the Height of Point is an average height value of high point regions of the top surface of the work piece and the Depth of Surrounding is an average depth of low point regions of the top surface of the work piece.

5. The method as claimed in claim 4, wherein in the related-parameter inputting step, the oil content is volumes of stored oil in the top surface of the work piece under the desired flatness of the top surface of the work piece.

6. The method as claimed in claim 1, wherein in the related-parameter inputting step, the Height of Point is an average height value of high point regions of the top surface of the work piece and the Depth of Surrounding is an average depth of low point regions of the top surface of the work piece.

7. The method as claimed in claim 1, wherein in the related-parameter inputting step, the oil content is volumes of stored oil in the top surface of the work piece under the desired flatness of the top surface of the work piece.

* * * * *